Nov. 9, 1926.
R. W. GUNN ET AL
1,606,420
STANDING VALVE CONNECTION
Filed Jan. 14, 1924    2 Sheets-Sheet 1
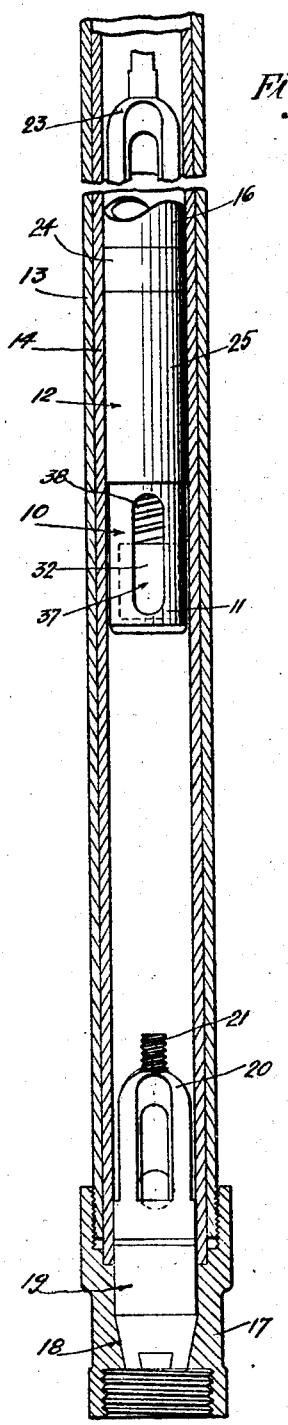
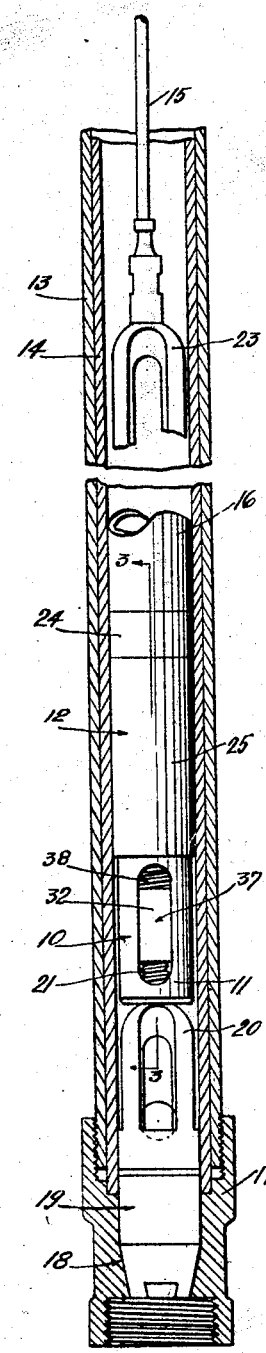
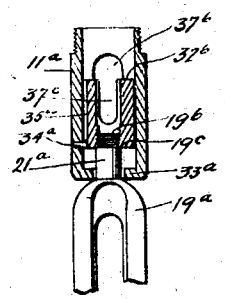
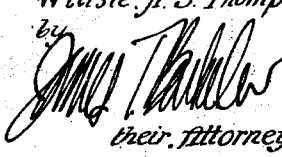
Inventors.
Robert. W. Gunn.
Willsie. A. S. Thompson.
by
their. Attorney.

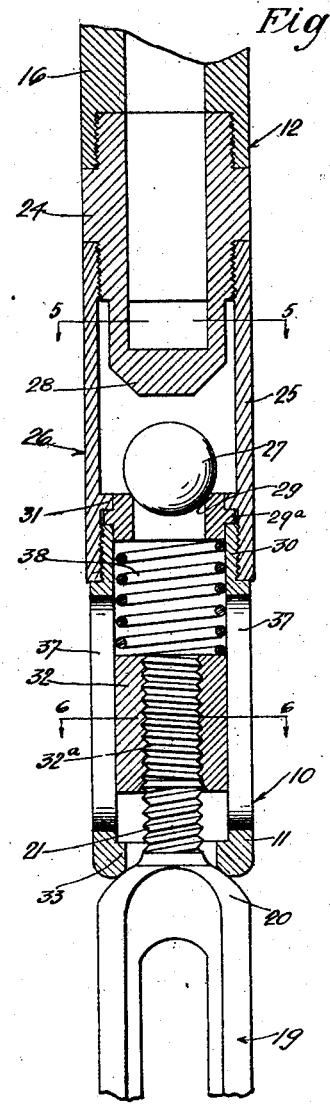

Patented Nov. 9, 1926.

1,606,420

UNITED STATES PATENT OFFICE.

ROBERT W. GUNN AND WILLSIE A. S. THOMPSON, OF LOS ANGELES, CALIFORNIA.

STANDING-VALVE CONNECTION.

Application filed January 14, 1924. Serial No. 686,112.

This invention has to do with means for releasably coupling standing valves to plunger elements of deep well pumps, whereby said standing valves may set and withdraw through the medium of the sucker rods by which the plungers are suspended and reciprocated. It is the object of the invention to provide a coupling device of a simple, positive and dependable nature.

There are two general types of coupling devices in use, one in which the standing valve is connected to the plunger element by a Garbutt rod (well known to workers in the art), and the other wherein the standing valve and plunger are completely separable but have interlocking elements which are adapted to engage when the pump plunger is lowered beyond its working stroke into contact with the standing valve, the locking and unlocking of the elements being accomplished by rotation of the sucker rods, either through manipulation from the top of the well or by cam action occurring between said elements during relative longitudinal movement thereof.

The second type of device, under which class the present invention falls, has many advantages over the first. For instance, it may be used in connection with a pump plunger having a bottom valve, without the necessity of special attachments; it does not limit the pump stroke; the fluid inlet to the plunger is unobstructed by reciprocatory rods; the plunger may be withdrawn without disturbing the standing valve, thereby obviating the necessity of priming the pump after each plunger withdrawal, and preventing the subjection of the sucker rods to undue tension in the event the standing valve is "sanded in"; there is no danger of the standing valve becoming unseated from its shoe in case the plunger is inadvertently raised to a point above the upper limit of its working stroke, etc.

Our device has all the advantages above set forth, together with additional features which render it superior to such devices as have gone before. For example, all other devices, as far as we are aware, utilize a pin and slot (usually an angular or bayonet slot) connection to effect the releasable coupling between standing valve and plunger, while we employ a threaded connection. The threaded connection is superior for the purpose in that there is no danger of the standing valve becoming "lost" through accidental disconnection during the lowering and elevating operation (a danger which exists when the pin and slot type of connection is used due to the fact that unintentional relative longitudinal or rotary movement between plunger and valve may be caused by various operating conditions before the valve is seated and thereby effect the release of the interlock); it avoids the possibility of the plunger striking and picking up the standing valve if the plunger inadvertently strokes too low; it is not dependent upon a particular angular relationship between the locking element before the grip "takes hold" of the valve; and a sanded-in standing valve may be loosened from its seat by rotation of the plunger after the valve is coupled thereto without likelihood of damaging the coupling, while in the pin and slot type, the pins, under similar conditions, are subjected to severe shearing stresses and strains and are very apt to yield, thus leading to a "fishing job". It requires positive, intentional rotation of the sucker rod to effect a coupling or uncoupling of our device.

Briefly described, the coupling consists of a threaded shank on top the standing valve, and a grip on the plunger element adapted to releasably engage the shank upon occasion. The grip comprises a sleeve threadably joined to the plunger element, and a nut confined within the sleeve bore and capable of limited longitudinal movement with respect thereto, though held against rotary movement. When setting a valve, the shank is threaded into the nut, and the plunger, with valve attached thereto, is lowered away by the usual sucker rods until the valve seats within the shoe bore at the well bottom, there being passageways through the sleeves at points above the nut to allow the passage of air and fluid from beneath the valve into the plunger bore during the lowering process. The plunger is then rotated to unscrew the nut from the shank, the nut simultaneously rising through the sleeve bore due to the thread pitch, whereupon the plunger is lifted clear of the valve into position for pumping actuation, the nut bore and sleeve passageways admitting fluid to the plunger bore from beneath the grip.

In case the standing valve is to be withdrawn, the plunger is lowered into contact with the standing valve, the nut coming to rest on top the threaded shank and the sleeve continuing in its downward movement until it bears on the valve crown. Thereupon the plunger is rotated to thread the nut on the shank and thereby couple the plunger and valve, so the valve may be withdrawn along with the plunger.

Other features of novelty and objects of the invention will be set forth in the following detailed description, reference being had to the accompanying drawings, in which:

Figure 1 is a sectional, contracted view of the lower end of a pump barrel, the standing valve and plunger being shown in elevation, and the plunger and grip being shown approximately at the lower limit of the working stroke of the pump.

Fig. 2 is a view similar to Fig. 1, but showing the plunger lowered until the grip is in contact with the standing valve.

Fig. 3 is a vertical section on line 3—3 of Fig. 2.

Fig. 4 is a view similar to Figure 3 showing the grip in threaded engagement with the standing valve.

Fig. 5 is a section on line 5—5 of Figure 3 showing the ball bumper used in connection with the "blind" valve.

Fig. 6 is a horizontal section on line 6—6 of Figure 3; and

Fig. 7 is a vertical section on line 7—7 of Figure 6, showing one means for limiting the longitudinal and preventing rotary movement of the nut within the grip.

Fig. 8 is a sectional view showing a modified type of grip.

We have shown our device as applied to a cupless pump plunger, the peripheral face of which is ground to fit the working barrel, but this is merely for the purpose of illustrating one application of the invention and is not to be construed as a limitation thereof. Neither is the showing of a particular type of pump lining, working and standing valve, etc., to be construed as in any way limiting the invention.

In the drawings, the numeral 10 generally indicates a "grip" which comprises, in part, a cylindrical sleeve 11 adapted to be attached to the plunger element generally indicated at 12. This plunger element is made up of the usual valve cages, bushings, etc., arranged in any operative manner, and the grip is adapted to be secured to the lowermost member of the element whether it be the plunger proper, working valve or other member. It is of advantage to locate the standing and working valves as close together as possible, thereby reducing the undesirable effect arising from the compression of gas between the two valves. We have therefore illustrated the use of a "bottom" valve for the plunger, and have shown the grip attached directly thereto, without intending to infer that the grip is limited to the specific mode of attachment, or to attachment to this particular member of the plunger element. The working barrel 13 supports pump liners 14 within which the plunger element 10 is adapted to be reciprocated by the usual sucker rods 15, the tubular plunger proper 16 and liners 14 being ground to fit. At the lower extremities of barrel 13 and liner 14, is the shoe 17 having the usual tapered seat 18 for receiving the tapered extremity of standing valve 19. The cage of valve 19 has a usual crown 20, and extending upwardly from this crown is a threaded, centrally arranged shank 21.

Sucker rods 15 are coupled at 22 to an open crown 23 at the top of plunger proper 16, while a plunger bushing 24 threadably connects the plunger proper to the sleeve or cage 25 of "blind" or enclosed bottom valve 26. The valve ball 27 is confined within sleeve 25 and is limited in its vertical movement by a stirrup bumper 28 on bushing 24 and valve seat 29. Sleeve 11 of grip 10 has an extension 30 adapted to be threaded into the bore of valve sleeve 25, and valve seat 29 has an annular flange 29ª adapted to be clamped between the internal flange 31 of sleeve 25 and the upper extremity of extension 30, whereby the seat is retained in proper position.

Fitting relatively loosely and capable of longitudinal sliding movement within the bore of sleeve 11, is a nut 32, which is co-axial with sleeve 11 and hence with plunger element 12, the internal, annular sleeve flange 33 limits the sliding movement of the nut in one direction. Nut 32 is held against any appreciable amount of rotary movement with respect to the sleeve by any of the well known keying or splining methods. We have illustrated one such method in the form of a pin 34 carried by and extending through the wall of sleeve 11, and thence projecting into the longitudinally extending slot or way 35 milled in the peripheral face of nut 32. By stopping slot 35 short of the lower end of nut 32, a shoulder 36 is formed, which shoulder is adapted to co-act with pins 34 and thereby provide a convenient means for limiting the upward movement of nut 32 with respect to sleeve 11. Other movement limiting means may be substituted for the pin and slot arrangement without departing from the spirit and scope of our broader claims, and, in some instances, such means may be entirely eliminated.

Sleeve 11 is of slightly less outside diameter than is the plunger element, and slots 37 are provided through the sleeve and extend above nut 32 even when the latter is at the limit of its upward movement.

When standing valve 19 is to be set, shank 21 is manually threaded into nut 32 as shown in Figure 4, and the whole assembly lowered away through the work barrel until the valve seats in shoe 17. During the lowering process air and fluid below the standing valve may pass to the interior of the plunger through passageways 37; the building up of pressure beneath the plunger being thus prevented.

The valve is pressed home by pressure directed on crown 20 by sleeve 11, no strain being imposed on the threaded connection between valve arm grip by such pressure. By only partially screwing the shank into nut 32, the valve may be hammered or driven home by short strokes of the plunger, the space between the bottom of the nut and the top of annular flange 33 providing the necessary lost motion, and the blow being delivered by the end of sleeve 11 on valve crown 20. During this hammering process, no strain is placed on the threads of the nut and shank. Such hammering is not usually necessary, however, so ordinarily shank 21 is fully, but not necessarily tightly, screwed into nut 32, and the valve is seated by steady pressure rather than by short and sharp blows. The pitch of the nut and shank threads is such that when the plunger, with valve attached, is moved vertically through the pump barrel there is no danger of the grip becoming uncoupled from the valve by reason of vibration or other conditions which might tend to unscrew the coupling, even though the shank be not tightly screwed into the nut.

After the valve is firmly seated, it is frictionally retained against rotary movement within the shoe, and plunger 12, and hence grip 10, is rotated through the medium of the sucker rods in a manner to unscrew nut 32 from shank 21, the nut moving upwardly through the sleeve bore during this period. As soon as the nut is completely unscrewed from the shank, the plunger is raised to pumping position (Figure 1) and during subsequent pumping strokes there will exist no co-action between the grip and standing valve. Fluid flowing into the pump barrel between the standing valve and the plunger during an up stroke of the pump, passes, during the succeeding down stroke of the pump, through the nut bore and valve 26 into the plunger bore. Fluid also passes upwardly about sleeve 11 and through passageways 37 to the interior of the plunger element. It is evident that the grip in no way interferes with the proper functioning of the pump, and that slots 37 insure ample passageways for the inlet of fluid.

In case the plunger strokes too low, for instance, by reason of the sucker rods becoming stretched, the consequent contacting of grip and standing valve will not damage the nut or shank threads, for the nut immediately comes to rest on top the shank.

In case the standing valve is to be "picked up", plunger 12 is lowered to the position of Figure 2, nut 32 first coming to rest on top of shank 21, and sleeve 11 continuing in its downward movement until its lower end bears on standing valve crown 20. Pins 34 and shoulder 36 are so relatively located that there is clearance between them after shank 21 has thrust nuts 32 upwardly as far as it may. Due to the co-axial arrangement of shank 21, plunger 12, sleeve 11 and nuts 32, the threaded bore 32ª of nut 32 registers with shank 21 so, upon subsequent rotation of plunger 12, and grip 10 through the medium of sucker rods 15, nut 32 is screwed onto shank 21. Continued rotation of the grip draws nut 32 into close contact with sleeve flange 33, so, in effect, sleeve 11 is clamped between nut 32 and valve 19. By still further continuing the rotation of the grip, valve 19 is rotated within and thus loosened from its seat in the shoe, even though it may have been "sanded-in." The valve is then lifted bodily along with the plunger.

It will be noted that at no time during the process of threadably engaging or disengaging the nut and shank are the threads of said members subjected to undue strain, for during these periods of engagement and disengagement, the weight of the plunger and sucker rod is taken up between sleeve 11 and crown 20, the necessary relative longitudinal movement between the valve and grip occurring only between nut 32 and shank 21, and the only weight supported by the threads being that of nut 32.

In order that nut 32 may more quickly and positively threadably engage shank 19 during the initial period of grip rotation, especially in the event the fluid within the barrel is of such consistency as to retard the longitudinal sliding movement of the nut, we may provide an expansion spring 38 within sleeve 11. This spring is adapted to yieldably urge nut 32 downwardly, and may be confined between nut 32 and valve seat 29. However, nut 32 is of such weight that spring 38 may be omitted under usual operating conditions, and therefore we do not enter it as a necessary element in all our claims.

In Figure 8 we have illustrated a grip of modified construction. The shank 21ª of standing valve 19ª has a reduced and threaded extension 19ᵇ, a shoulder 19ᶜ being thus formed between the shank proper and its extension. When nut 32ᵇ is screwed into full threaded engagement with shank extension 19ᵇ, its lower end bears on shoulder 19ᶜ, rather than on sleeve flange 33ª, as is true when the grip is constructed along the lines previously described. Thus, when the nut is fully screwed onto the shank, sleeve 11ª and valve 19ª may have relative longitudinal movement, such movement being limited in one direction by the engagement of the end of sleeve 11ª with the crown of valve 19ª, and in the other direction by the engagement of flange 33ª with the lower end of nut 32ᵇ. The lost motion between sleeve and valve made possible by this provision of two longitudinally spaced shoulders (namely, the valve crown and shoulder 19ᶜ) on valve 19ª, may be utilized to advantage in driving the valve home as described in connection with valve 19, and in jarring the valve loose from its seat by a succession of short upstrokes of the plunger, the blows from said upstrokes taking place between the flange 33ª and the bottom of nut 32ᵇ.

Nut 32ᵇ is provided with slots 37ᶜ in register with sleeve slots 37ᵇ to allow the passage of fluid from and to the interior of sleeve 11, irrespective of the relative longitudinal position of sleeve and nut.

From the above it will be evident to those skilled in the art that we have provided a novel coupling device which is simple and sturdy of construction and yet positive, quick and effective in its operation. While we have illustrated the preferred embodiment of the invention, we do not wish to be limited to the structure and arrangement disclosed in the drawings and described in the specification, except for such limitations as a fair interpretation of the appended claims may import.

We claim:

1. In a pump, a plunger element, a standing valve including an upwardly extending threaded shank, two upwardly facing and longitudinally spaced shoulders on the valve, one of said shoulders being intermediate the ends of the shank; a grip on the plunger element and comprising a sleeve, a non-rotatable nut mounted for limited longitudinal sliding movement within the sleeve and adapted to engage the shank threadably when the sleeve and valve are relatively rotated, one end of said nut being adapted to engage said one shoulder, a shoulder on the sleeve underlying and adapted to engage said one end of the nut, and one end of the sleeve being adapted to engage the other shoulder on the valve when the nut is threaded home on the shank, said one shoulder and sleeve shoulder being longitudinally spaced when said end of the sleeve engages said other valve shoulder, all in a manner whereby the sleeve and nut are capable of relative longitudinal movement when the nut is threaded home on the shank.

2. In a pump, a plunger element and a standing valve, a threaded shank extending upwardly from the crown of the valve, an upwardly facing shoulder on said shank intermediate its ends; a grip on the plunger element and comprising a sleeve, a non-rotatable nut mounted for limited longitudinal sliding movement within the sleeve and adapted to engage the shank threadably when the sleeve and valve are relatively rotated, the end of said sleeve being adapted to engage the crown of the valve and one end of the nut being adapted to engage said shoulder when the nut is threaded home on said threaded shank, a shoulder on the sleeve and underlying and spaced from a downwardly facing shoulder provided on the nut, when the sleeve engages the valve crown and the nut engages the upwardly facing shoulder, whereby the sleeve and nut are capable of limited relative longitudinal movement when the nut is threaded home on the shank.

3. In a pump, a plunger element, a standing valve including an upwardly extending threaded shank, a grip on the plunger element and embodying a sleeve, a non-rotatable nut mounted for limited longitudinal sliding movement within the sleeve and adapted to engage the shank threadably when the sleeve and valve are relatively rotated, a shoulder on the valve adapted to be engaged by the nut to establish the limit of longitudinal movement of the nut along the shank in one direction, the nut being in full threaded engagement with the shank when at said limit, a second shoulder on the valve adapted to be engaged by the sleeve for limiting sleeve movement in said one direction when said nut and shank are in full threaded engagement, and means adapted to limit longitudinal movement of the sleeve in the opposite direction when the nut and shank are in full threaded engagement; said second shoulder and said means being longitudinally spaced to permit relative longitudinal movement of the sleeve and nut when said nut is in full threaded engagement with the shank.

4. In a pump, a plunger element and a standing valve, a threaded shank extending upwardly from the valve, a grip on the plunger element and embodying a sleeve, and a non-rotatable nut mounted for limited longitudinal sliding movement within the sleeve and adapted to engage the shank threadably when the sleeve and valve are relatively rotated; said sleeve being capable of limited longitudinal movement relative to the valve when the nut and shank are in full threaded engagement.

5. In a pump, a plunger element, a standing valve including an upwardly extending threaded shank, a grip on the plunger element and embodying a sleeve, a non-rotatable nut mounted for limited longitudinal sliding movement within the sleeve and adapted to engage the shank threadably when the sleeve and valve are relatively rotated, a shoulder on the valve adapted to be engaged by the nut to establish the limit of longitudinal movement of the nut along the shank in one direction, the nut being in full threaded engagement with the shank when at said limit, a second shoulder on the valve adapted to be engaged by the sleeve for limiting sleeve movement in said one direction when said nut and shank are in full threaded engagement, and a shoulder on the nut adapted to limit longitudinal movement of the sleeve in the opposite direction when the nut and shank are in full threaded engagement; said second shoulder and said nut shoulder being longitudinally spaced to permit relative longitudinal movement of the sleeve and nut when said nut is in full threaded engagement with the shank.

In witness that we claim the foregoing we have hereunto subscribed our names this 21st day of December, 1923.

ROBERT W. GUNN.
WILLSIE A. S. THOMPSON.